United States Patent
Huang et al.

(10) Patent No.: US 6,590,879 B1
(45) Date of Patent: Jul. 8, 2003

(54) METHOD, MOBILE STATION, BASESTATION AND MOBILE COMMUNICATIONS SYSTEM FOR PERFORMING HANDOFF INDEPENDENTLY FOR GROUPS OF PHYSICAL DIRECT SEQUENCE-CODE DIVISION MULTIPLE ACCESS CHANNELS

(75) Inventors: Wei Huang, Nepean (CA); Ning Guo, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/264,133

(22) Filed: Mar. 5, 1999

Related U.S. Application Data (60) Provisional application No. 60/098,538, filed on Aug. 28, 1998.

(51) Int. Cl.[7] .................................................. H04Q 7/00
(52) U.S. Cl. ........................ 370/331; 370/337; 455/436; 455/442
(58) Field of Search ................................ 370/331–333, 370/337, 335, 344, 347, 468, 465; 455/442, 436–439, 443, 444

(56) References Cited

U.S. PATENT DOCUMENTS

| | | | | |
|---|---|---|---|---|
| 5,771,229 A | * | 6/1998 | Gavrilovich | 370/342 |
| 5,987,326 A | * | 11/1999 | Tiedemann, Jr. et al. | 455/442 |
| 6,018,662 A | * | 1/2000 | Periyalwar et al. | 455/442 |
| 6,148,209 A | * | 11/2000 | Hamalainen et al. | 455/450 |
| 6,198,937 B1 | * | 3/2001 | DeClerck et al. | 455/517 |
| 6,230,005 B1 | * | 5/2001 | Le et al. | 455/414 |
| 6,243,582 B1 | * | 6/2001 | Lahtinen | 455/436 |
| 6,377,809 B1 | * | 4/2002 | Rezaiifar et al. | 455/455 |

OTHER PUBLICATIONS

TIA/EIA/SP–3693, pp. 6–383 to 6–462 and 7–167 to 7–182.
International Telecommunications Union, Radiocommunications Study Groups, cdma2000 RTT Candidate Submission to US TG8/1, Vo.17/Jun. 1, 1998, Jun. 2, 1998, pp. 1 to 252.

* cited by examiner

*Primary Examiner*—Duc Nguyen (57) ABSTRACT

A mobile station is disclosed that functions within a 3G DS-CDMA communication system, in which a separate active set is defined for each of the different channel types. With the use of a separate Fundamental Channel Active Set, Forward Link-Supplemental Channel Active Set, Reverse Link-Supplemental Channel Active Set, and Dedicated Control Channel Active Set a flexible handoff of a multi-service active session is possible. Each type of channel is capable of handing off separately, thereby allowing channels with different requirements, such as resource requirements or signal strength requirements, to be handed off at different times, to different basestations, and/or in different methods (ie. soft or hard handoff). The handoffs are initiated by a basestation controller by updating, within the mobile station and the applicable basestations, the particular active set corresponding to the physical channel requiring a handoff.

32 Claims, 4 Drawing Sheets

METHOD, MOBILE STATION, BASESTATION AND MOBILE COMMUNICATIONS SYSTEM FOR PERFORMING HANDOFF INDEPENDENTLY FOR GROUPS OF PHYSICAL DIRECT SEQUENCE-CODE DIVISION MULTIPLE ACCESS CHANNELS

This application claims benefit of provisional Application No. 60/098,538 filed Aug. 28, 1998.

FIELD OF THE INVENTION

This invention relates to a system and method for mobile stations to maintain multiple physical channels to basestations within a direct sequence-code division multiple access mobile communications system and more specifically, to the handoff operation of such mobile stations and basestations.

BACKGROUND OF THE INVENTION

Improvements are consistently being made on previous cellular technology standards. Each subsequent standard has benefits over the previous, such as increased bandwidth, reductions in interference, or simply more flexible functionality. Since mobile stations that function within these standards are portable, one key component of all standards is the method by which an active call or session can be transferred between basestations, hereinafter referred to as handoff. Such a procedure switches the current radio link for a mobile station from a first basestation to a second basestation in order to maintain communications when the mobile station experiences changes in the communication conditions. Changes in communication conditions can be caused by crossing boundaries of basestation cells, falling into deep fades, or a rearrangement of radio resources at the basestation level. Adjustments in the techniques used to handoff active sessions between basestations must be made in parallel with fundamental changes to the overall standard.

Direct Spreading (DS)-Code Division Multiple Access (CDMA) technology standards are going through an ongoing process of improvements and updates. The "original" DS-CDMA standard is a second generation CDMA standard defined in Telecommunications Industry Association/Electronic Industry Association/Interim Standard 95-A (TIA/EIA/IS-95-A). This cellular standard operates predominantly for voice services in full duplex mode. For every forward link (FL) CDMA channel that is established, a reverse link (RL) CDMA channel is also initiated. This standard does not support asymmetrical service to be provided to the user.

The handoff between basestations in the IS-95-A standard can be triggered in two ways. First, it can be triggered by the mobile station due to a deterioration in the signal strength or quality at the mobile station. Secondly, it can be triggered by one of the basestations currently communicating with the mobile station, hereinafter referred to as active basestations, due to a deterioration in the signal strength or quality at the basestation or due to bandwidth constraints at the basestation which require the handoff of an active session to another basestation, hereinafter referred to as a target basestation.

The IS-95-A standard supports soft, softer, and hard handoff for voice services from an active basestation to a target basestation. In soft handoff, both the active and target basestations have a forward and reverse CDMA channel established with the mobile station prior to the termination of the forward and reverse CDMA channels between the mobile station and the active basestation and prior to the target basestation's assumption of the role of active basestation. Softer handoff is identical to soft handoff, but the "active" and "target" basestations are actually resources provided by the same basestation. In hard handoff, the target basestation replaces the active basestation by immediately terminating the forward and reverse CDMA channels between the mobile station and the active basestation before the new channels are fully established.

Handoffs triggered by the mobile station are performed on the basis of signal strengths measured by each mobile station for basestations which are in range of the mobile station. A special channel called the "pilot channel" is generated by each basestation for the purpose of this measurement. Certain basestations that are equipped with multiple directional antennae are capable of functioning with multiple pilot channels, each pilot channel corresponding to a particular sector. Basestations capable of operating in multiple frequency bands may generate a pilot channel for each such band.

Within the IS-95-A standard, there are four pilot sets of identifiers defined for use in the normal operation of a mobile station. Each of these sets of identifiers contains information which identifies or permits an identification of a set of basestations resources. For example, each pilot channel includes a code which identifies basestation resources consisting of a basestation and/or a sector of a basestation and/or a frequency band and these codes can be used in the sets of identifiers. These sets include an Active Set (AS), a Candidate Set (CS), a Neighbour Set (NS), and a Remaining Set (RS). The AS contains the set of identifiers which correspond with basestation resources currently assigned to the particular mobile station. The CS contains the set of identifiers for basestations transmitting pilot channels with sufficient signal strength to be successfully demodulated, but that have not been placed in the AS. The NS contains the set of identifiers of basestation resources that are probable candidates for handoff, normally due to the fact that they are geographically near the mobile station. Finally, the RS contains the set of all identifiers for allowable basestation resources within the current frequency assignment excluding those included in the AS, CS, and NS.

In simplistic terms, the handoff procedure is done with the updating of the AS which changes the set of basestation resources assigned to the particular mobile station. Whenever a change in the AS occurs, both the mobile station and the relevant basestations must take the necessary steps to set up or tear down channels such that only basestations which exist in the updated AS have active channels.

There are a number of issues concerning the IS-95-A standard that resulted in another second generation CDMA standard being formed. One of these issues, as discussed previously, is that the IS-95-A standard does not support the use of asymmetrical communications. The enhanced second generation CDMA standard, defined by TIA/EIA/IS-95-B, continues assigning a fundamental channel (FCH) with both a FL CDMA channel and a RL CDMA channel to be used for voice service, but also allows for the assignment of FL and RL supplemental channels (SCHs) separately for use in limited data services. These SCHs allow communication systems defined by the IS-95-B standard to handle asymmetrical data communications in a more efficient method than previously done with the IS-95-A standard.

There are numerous other advances made in the IS-95-B CDMA standard that make it significantly more flexible compared to the IS-95-A standard. For example, the initial AS during the initialization of an active session for the IS-95-B standard is capable of containing multiple pilot channels, thus allowing a session to be started between the mobile station and more than one basestation. As well, there is a significant enhancement with regard to inter-frequency handoff procedures within the IS-95-B standard that was not addressed in the IS-95-A standard. In the IS-95-B standard, a basestation can direct a mobile station to search for pilot channels in different operating frequencies through the temporary termination of normal communications. With use of pilot channel measurement reports sent from the mobile station, the basestation makes inter-frequency handoff decisions. A Candidate Frequency Neighbor Set (CFNS) and a Candidate Frequency Search Set (CFSS) are added to the previously defined AS, CS, NS, and RS in the IS-95-B standard to enable the inter-frequency handoff capability. The CFNS is a set of all pilot channels available on the candidate frequency while the CFSS is a subset of the CFNS that includes all pilot channels on the candidate frequency that are to be searched for suitable signal strength.

Overall, handoff in the IS-95-B standard, defined within the TIA/EIA/SP-3693 standard pages 6-383 to 6-462 and pages 7-167 to 7-181, hereby incorporated by reference, is performed in a similar fashion to that done for the IS-95-A standard, but with additional options and flexibility. There are backup procedures, in case of failure during hard handoff, within the IS-95-B standard that are not defined within the IS-95-A standard. In the situation of a failure to initiate communications with the target basestation, the mobile station re-establishes a channel with the original basestation. Another difference between the two standards is the previously mentioned inter-frequency handoff capability that requires modified handoff management signals.

Similar to the IS-95-A standard handoff for the FL and RL CDMA channels, the IS-95-B standard requires the FCHs and SCHs to be transferred simultaneously with use of the same type of handoff, soft or hard. Therefore, during soft handoff, all of the established physical channels must be supported by both the first and second basestations. If it is not possible for all physical channels to perform a soft handoff, a hard handoff is likely performed for all of the channels.

The third generation DS-CDMA standard, referred to as the 3G DS-CDMA standard, is currently defined with increased flexibility and bandwidth than the IS-95-B standard. Further improvements are suggested in a preliminary report entitled "The cdma2000 RTT Candidate Submission" published Jun. 2, 1998 by the Technical Reference 45.5 wideband spread spectrum digital technology subcommittee of the mobile and personal communications public 800 standards committee of the TIA for submission to the U.S. Task Group 8/1 of the International Telecommunication Union, hereby incorporated by reference. The 3G DS-CDMA systems have a different physical layer design and support many more services than either IS-95-A or IS-95-B. These systems are specifically designed to handle voice service, circuit data service, packet data service, or any combination of such services. A voice service requires a FCH with a FL and a RL and possibly an additional physical channel for signalling. A circuit data service or a packet data service requires one or more SCHs assigned on the FL and/or the RL, depending upon the packet data information flow directions, and possibly requires a dedicated control channel (DCCH) established in both directions to carry power control, radio link protocol (RLP), media access control (MAC) and/or layer 2/3 signalling. The 3G DS-CDMA standard allows for the establishment of a FCH with a FL and a RL, one or more FL-SCHs and/or RL-SCHs, and a DCCH with a FL and a RL. Therefore, systems using the 3G DS-CDMA standard are capable of operating voice, circuit data, and packet data services simultaneously. An additional feature of the 3G DS-CDMA standard is the capability of having SCHs shared between packet data users. This is efficient for cases in which a packet data service is bursty with individual users only transmitting occasionally.

One key problem that needs to be addressed with regard to the 3G DS-CDMA standard is a how to perform a handoff that can support the extensive flexibility of the standard and cope with the 3G physical layer design. The use of the IS-95-B handoff procedure within systems supporting the 3G DS-CDMA standard would result in handoff scenarios with high costs on efficiency and flexibility and handoff scenarios not being supported at all, causing a high call blocking rate and/or interference level.

A handoff technique proposed for the 3G DS-CDMA standard within the above-referenced preliminary report continues use of the four pilot sets defined for the IS-95-A standard, those being the AS, CS, NS, and RS. Since the preliminary report requires reverse compatibility with IS-95-A and IS-95-B, it is therefore assumed that the previously defined pilot sets, CFNS and CFSS, from the IS-95-B standard are also maintained. In the proposed handoff, the AS is divided into a Full Active Set (FAS) and a Reduced Active Set (RAS). The RAS is a subset of the larger FAS and is used in situations where specific channels do not have similar handoff capabilities or do not require the same handoff arrangement as other channels. The 3G DS-CDMA standard, as currently defined, has not established a procedure or an implementation for such a handoff with the FAS and the RAS.

There are limitations on the handoff as contemplated by the cdma2000 proposal. For one, the defined RAS, according to the cdma2000 proposal, is used solely for physical channels carrying unconstrained delay data applications. Hence, the standard still requires the handoff of most physical channels to be done in parallel and simultaneously with use of the FAS, which is comparable to the IS-95-B standard.

A handoff procedure is thus needed for the 3G DS-CDMA standard that can utilize the full flexibility incorporated within the 3G standard.

SUMMARY OF THE INVENTION

It is an object of the present invention to mitigate one or more disadvantages of the prior art and, in particular, to provide a technique for handing off an active session between a mobile station and at least one basestation with the flexibility of transferring specific channels and/or channel types at the same or different times and using the same or different handoff methods.

The present invention, according to a broad aspect, provides a mobile station that has a number physical channels between itself and a set of basestations. Groups of one or more physical channels are defined, for example according to channel type. The mobile station is capable of performing handoffs independently for each of the groups of physical channels. In an exemplary embodiment, a plurality of groups have associated active sets that when updated allow the handoffs for the groups of channels associated with the particular active sets to be performed independently.

In further aspects, the present invention provides a basestation, a mobile communication system, and a method of performing handoffs. In each of these aspects, a mobile station is arranged to perform independent handoffs for groups of physical channels between the mobile station and a set of basestations similar to that in the broad aspect described above.

Preferably, the invention is applied in the context of a 3G DS-CDMA system in which the physical channels between the mobile station and the set of basestations consist of a fundamental channel, forward and reverse link supplemental channels, and a dedicated control channel. In this preferred embodiment, separate active sets are maintained for each of these channels.

BRIEF DESCRIPTION OF THE DRAWINGS

Preferred embodiments of the present invention are described with reference to the following figures, in which.

DETAILED DESCRIPTION OF THE PREFERRED EMBODIMENTS

Embodiments of the present invention are implemented as DS-CDMA components and systems in which a cellular structure is used, user mobility is supported and multiple physical channels between a mobile station and the network are supported. Preferred embodiments also provide a new handoff method and system for executing the handoff of an active session between basestations within a DS-CDMA communication system.

Embodiments will be described by way of example as they would be implemented in DS-CDMA components and systems which comply with the proposed 3G DS-CDMA standard as disclosed within the above referenced preliminary report, but with certain improvements. While the improved handoff method and system will be described as they would be applied in the 3G DS-CDMA environment, it is to be understood that this is not meant to limit the scope of the present invention to this particular environment.

A preferred embodiment of the present invention provides for the arbitrary assignment of physical channels into groups of one or more, and provides for each group a respective active set for use in controlling and implementing the handoff of the physical channels of that group. All the physical channels of a given group are handed off simultaneously and in the same manner, be it soft, softer, or hard. For example, a group may be defined to include any physical channels of a given 3G DS-CDMA type, these types including FCH, RL-SCH, FL-SCH, and DCCH.

Physical channels of various types are used to provide services. For example, a FCH can be used for a voice service, and a RL-SCH, FL-SCH and DCCH may be collectively used for a packet data service. The handoff of the physical channels providing a given service will hereinafter be referred to as a "service handoff". Thus a service handoff is a procedure that transfers all of the physical channels of one of the 3G services' communications from one set of basestations, to another set of basestations. Such a service handoff can be accomplished with one or more physical channel handoffs, in which a physical channel handoff is defined as a procedure that transfers a physical channel for a mobile station from a currently active basestation to one or more target basestations. As an aside, any handoff in the IS-95-A standard or IS-95-B standard under this definition is equivalent to a physical channel handoff.

Figure 1:
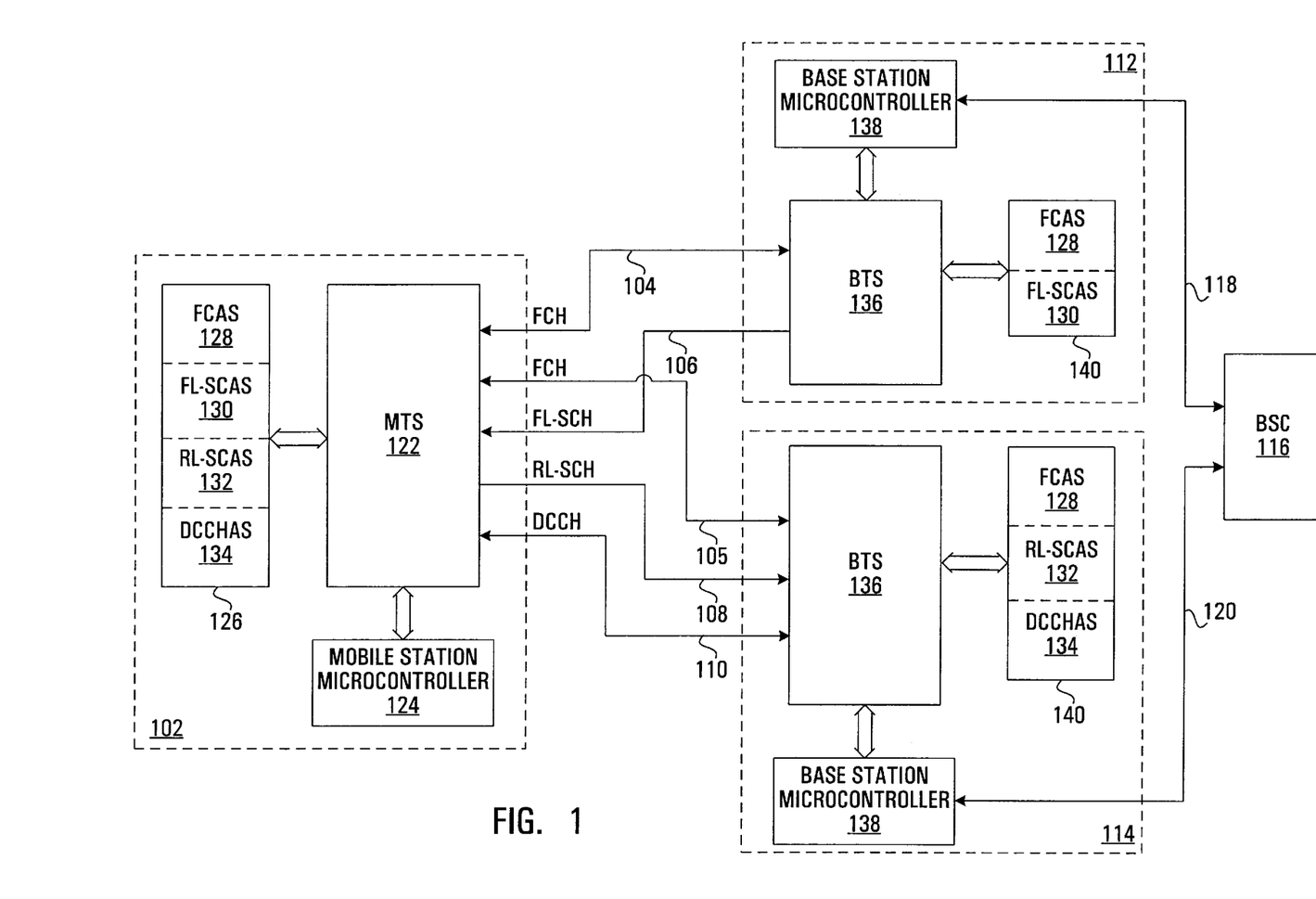
FIG. 1 is a simplified block diagram of a DS-CDMA communication system according to an embodiment of the present invention.

FIG. 1 illustrates a simplified block diagram of an example of a DS-CDMA communication system, according to an embodiment of the present invention, that comprises a mobile station 102, in communication with a mobile telecommunications network which in the illustrated embodiment includes a first basestation 112, a second basestation 114, and a basestation controller (BSC) 116. The mobile station 102 is coupled, via wireless physical channels 104, 106 to the first basestation 112 and via wireless physical channels 105,108,110 to the second basestation 114. The first and second basestations 112,114 are coupled to the basestation controller (BSC) 116, via links 118,120 respectively.

The mobile station 102 comprises a mobile station transceiver (MTS) 122 that transmits data to and/or receives data from the first and second basestations 112,114 via the wireless physical channels 104,105,106,108,110, a mobile station micro-controller 124 connected to the MTS 122, and an MTS active set memory 126, also connected to the MTS 122, for storing a series of active sets.

Each basestation 112,114 comprises a basestation transceiver (BTS) 136 that transmits data to and/or receives data from the mobile station 102 via the wireless physical channels 104,105,106,108,110, a basestation micro-controller 138 connected to the BTS 136, and a basestation active set memory 140.

As indicated above, the MTS is capable of communicating with the mobile communications network over multiple physical channels of multiple physical channel types so as to provide various services. FIG. 1, in addition to showing a mobile station and a mobile communications network, illustrates a potential channel assignment and handoff scenario which will be used by way of example to further define a preferred embodiment. For this example, the physical channels are in accordance with the 3G DS-CDMA standard. The physical channels include a FCH for providing a voice service, which is illustrated to be in a soft handoff state between the two basestations 112,114 and is thus shown as two lines 104,105. The physical channels also include three channels for providing a packet data service, these channels consisting of a FL-SCH 106 being maintained between the mobile station 102 and the first basestation 112, a RL-SCH 108 being maintained between the mobile station 102 and the second basestation 114, and a DCCH 110 being maintained between the mobile station 102 and the second basestation 114. This situation potentially could occur when the mobile station 102 is travelling from the cell area of the first basestation 112 into the cell area of the second basestation 114. As shown, the RL-SCH 108 and the DCCH 110 have completed their handoff to the second basestation 114, while the FL-SCH 106 has not and the FCH 104,105 is in the process of performing a soft handoff.

According to an embodiment of the invention, a separate active set is maintained by the mobile station 102 for each group of physical channels thereby allowing each group of physical channels to be independently handed off. In the example scenario illustrated in FIG. 1 there are physical channels of four types namely FCH, FL-SCH, RL-SCH, and DCCH (each in a respective "group" containing only one physical channel) and thus to provide service handoff flexibility with this example, four active sets are stored within the MTS active set memory 126 consisting of a Forward Link-Supplemental Channel Active Set (FL-SCAS) 130, a Reverse Link-Supplemental Channel Active Set (RL-SCAS) 132, and a Dedicated Control Channel Active Set (DCCHAS) 134, in addition to the already defined AS which will now be referred to as the Fundamental Channel Active Set (FCAS) 128. The FCAS is used to control handoff for the FCH(s) while each of the other sets are used to control handoffs of their respective physical channels. More particularly, the FL-SCAS is used for the FL-SCH, the RL-SCAS is used for the RL-SCH, and the DCCHAS is used for the DCCH. In addition, the previously defined CS, NS, and RS pilot sets are maintained and used as described below. The CFNS and CFSS or variants thereof may be used as before if appropriate. According to this preferred embodiment, all four possible active sets need to be established, saved, and maintained within the MTS active set memory 126 to allow for complete flexibility within the handoff procedures.

Preferably, the active set for each channel type is saved both at the mobile station 102 and at the basestations included in the particular active set, and who are therefore maintaining active communications with the mobile station for that channel type.

The FCAS 128 and the FL-SCAS 130 are saved within the basestation active set memory 140 of the first basestation 112 and the FCAS 128, the RL-SCAS 132, and the DCCHAS 134 are saved within the basestation active set memory 140 of the second basestation 114. It is to be understood that each of the basestations 112,114 would have such an active set memory 140 stored for each mobile station with which it is communicating, although all of the examples only consider the case of a single mobile station.

According to this preferred embodiment, the BSC decides when a mobile station is to perform a handoff, and more particularly decides which physical channels are to be handed off between which basestations. To instruct the mobile station to perform a handoff, the BSC sends an "enhanced extended handoff direction message" (EEHDM) to the mobile station which contains the size and contents of each of the active sets. A change in the contents of any particular active set indicates that a handoff from the basestation resources whose identifiers were previously included in the particular active set to the basestation resources whose identifiers are now included in the particular active set is to be executed. The message is sent via the BTS of at least one, and preferably only one, of the currently active basestations. The BSC decides when a handoff is necessary on the basis of basestation selection criteria and active set update procedures functioning within the BSC. In a preferred embodiment, these are based on a trade-off between a number of factors, such as handoff rate, interference level, signal quality, and available resources. Whenever a change in any of the active sets is instructed in an EEHDM, it is to be understood that both the mobile station and the relevant basestations must take the necessary steps, conventional or otherwise, to set up or tear down channels such that all of the basestations which exist in the updated AS, and, no others, have active channels.

During an active voice and/or data session within a preferred embodiment of the present invention, the combination of the mobile station, the BTS of at least one active basestation, and the BSC manage the physical channels between the mobile station and the basestations and therefore, manage the handoff of such channels. In a preferred embodiment, mobile assisted handoff (MAHO) is utilized similar to that performed for the IS-95-A and IS-95-B standards. In this case, each mobile station has the capability of continuously searching for potential handoff targets by measuring pilot channel strengths from surrounding basestations and reporting the pilot strengths to the BSC through the BTS of at least one of the active basestations. The mobile station reports the pilot strengths when either it is requested to do so by a basestation or when predetermined conditions are met, such as the conditions set out in section 6.6.6.2.5.2 of the IS-95-B standard. The BSC makes decisions, according to a preferred embodiment, with respect to updating the active sets after collecting the pilot signal strength information via the basestations. Subsequently, the BSC sends, via a currently active basestation, an EEHDM which informs the mobile station of the contents of the updated active sets. Since separate active sets may be maintained for groups of one or more physical channels which are arbitrarily defined, the BSC has considerable flexibility in controlling handoffs.

Depending upon a given implementation, the active sets may be subject to various limitations. For example, a maximum size limit may be imposed for each active set. In the presence of such a limitation, the BSC does not allow each active set to exceed its predetermined maximum. For example, physical channel types which require hard handoff have the maximum size of their respective pilot set limited to one.

A limitation may be imposed which requires a forward link and a related reverse link to utilize the same active set. More generally, the active sets for forward and reverse links may have either the same or different pilot channels. In the event that separate active sets are maintained for forward and reverse links, if a reverse link of a certain type, such as a RL-SCH has no corresponding forward link, the active set for the forward link is not used. The key reasons for allowing a separate active set for a forward link and a reverse link are to accommodate data service sessions that have unbalanced traffic on forward and reverse links, to allow for the spreading out of bandwidth requirements in the case that a basestation does not have sufficient resources, either on the forward or reverse link, to support handoff, and to provide flexibility in performing different types of handoff and/or support different active set maintenance schemes on the forward and reverse links.

Another limitation which may be imposed on any active set is that it must be a subset of another active set. In the case that a handoff is needed, an active set that is a subset of another active set searches the master active set for replacement basestation resources. A completely independent active set, on the other hand, does a normal search for replacement basestation resources in the case that a handoff is needed.

The above description has focused on the functionality of the BSC and the mobile stations. The basestations are also involved in the handoffs. Whenever a basestation is to either drop or instigate a given physical channel, it must be told to do so by the BSC.

Several handoffs implemented using the methods and systems described above will now be described by way of example. A service handoff procedure is now described with reference to FIG. 2 for an example where the DCCHAS may contain multiple members and therefore may be involved in soft handoffs, and the FL-SCAS is limited to contain only a single member and the single member is selected to be the identifier in the DCCHAS for the basestation resource with the strongest pilot channel and therefore may only be involved in hard handoffs. Hence, in this specific depicted situation, the FL-SCAS is maintained as a subset of the DCCHAS. During the first step 202 in the procedure, the mobile station measures and reports the signal strength of all the pilot channels it can see to the BSC. This may be done, for example, through similar procedures to those defined by the IS-95-A and IS-95-B standards for the measuring and reporting of the signal strengths for the AS, CS, NS, and RS. The reporting of this measured data is done through a pilot strength measure message (PSMM) which is sent by the mobile station to the BSC via the active basestation(s) for the DCCH in this example. In another embodiment, this sending of PSMMs is done via the active basestation(s) for the FCH.

Figure 2:
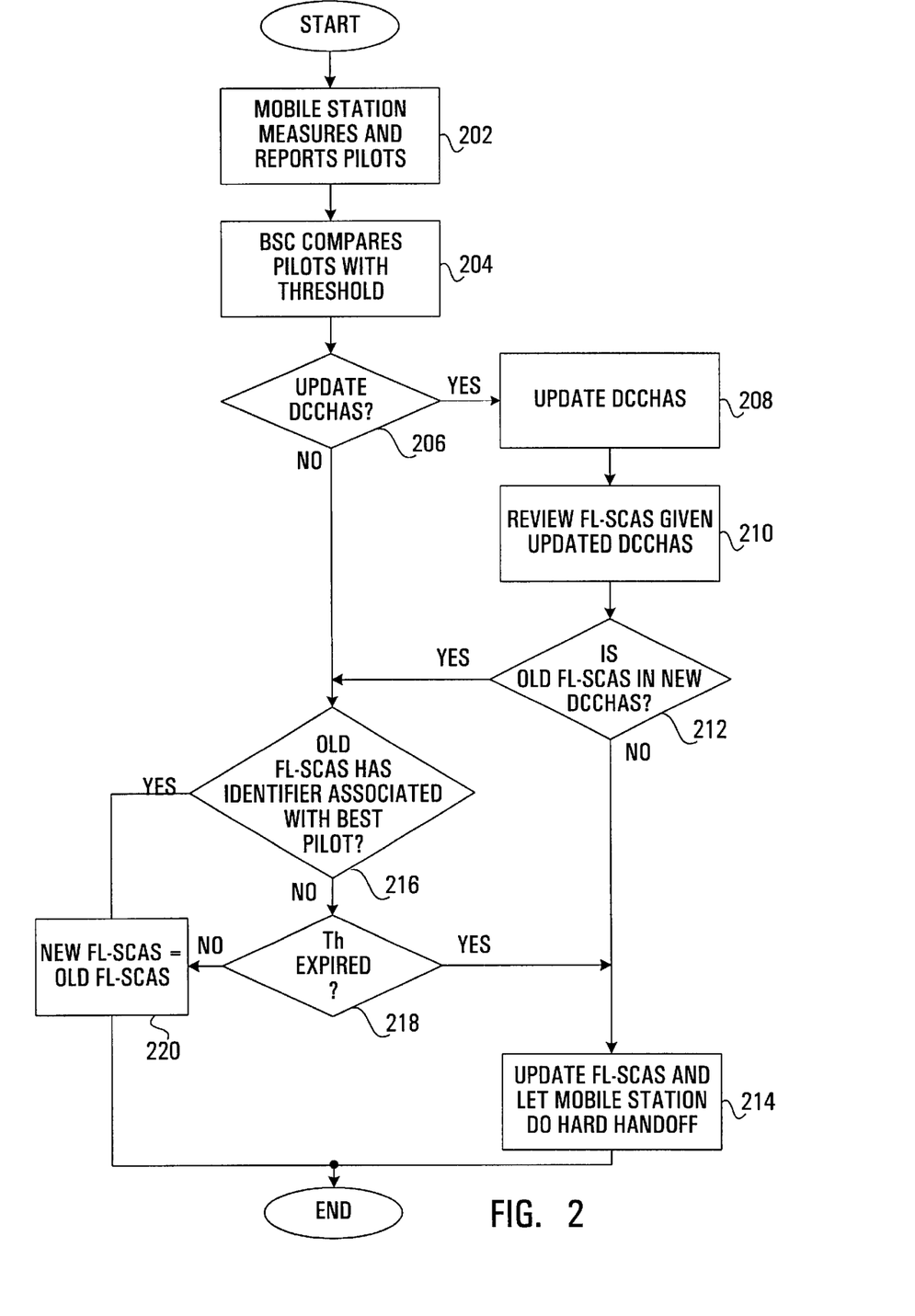
FIG. 2 is a flow chart illustrating the steps performed during a hard handoff of the Forward Link-Supplemental Channel according to a preferred embodiment of the present invention.

On the basis of the signal strengths of the pilot channels, and on the basis of any other criteria which have been established for consideration by the BSC, the BSC decides whether or not any handing off of any physical channels is required. This might consist of the BSC comparing, as depicted at step 204, the signal strength of each of the pilot channels with a predetermined threshold level, placing the identifiers for pilot channels whose signal strength exceeds the threshold in order according to signal strength, and determining if this changes the members of the DCCHAS or their respective order. At step 206, the BSC determines if the DCCHAS requires updating due to a change in the DCCHAS members or their order. If it is determined that the DCCHAS of the particular mobile station requires updating then the DCCHAS at the BSC is updated at step 208, but no extended handoff direction message is sent yet. Next, as depicted at step 210, the BSC reviews the current identifier of the FL-SCAS given the updated DCCHAS. First, the BSC determines, as depicted at step 212 whether the current identifier within the FL-SCAS is within the updated DCCHAS. If the BSC finds that the current identifier of the FL-SCAS is not within the new DCCHAS at step 212, the FL-SCAS is updated at step 214 with the identifier for the basestation producing the strongest pilot channel of the new DCCHAS. At this point, the BSC transmits a first EEHDM, via the currently active basestations of the DCCH, to the mobile station. This EEHDM is similar to the HDM defined within the IS-95-A standard and the EHDM defined within the IS-95-B standard, but it includes, according to a preferred embodiment, the contents of the FCAS and any other active sets being used; in this case, DCCHAS and FL-SCAS. The EEHDM also, within a preferred embodiment, indicates the target frequency band, the number of the channels of each type assigned to the mobile station, and the data rate and/or the duration the mobile station may use the assigned channels. In this example, the single identifier in the FL-SCAS will have changed, and the DCCHAS will include an additional identifier. When the mobile station receives the EEHDM, the mobile station initiates a hard handoff of the FL-SCH by switching from the previously active basestation to the target basestation identified in the EEHDM, and begins a soft handoff of the DCCH by maintaining the DCCH with both the previously active and target basestations. Subsequently, a second EEHDM is sent in which the first identifier is removed from the DCCHAS. In response to this, the DCCH channel with the previously active basestation is dropped thereby completing a soft handoff of the DCCH. In response to each EEHDM which is successfully implemented, the mobile station transmits a handoff completion message (HCM) to the BSC, via at least one of the currently active basestations of the DCCH.

In the occurrence that the DCCHAS is not updated at step 206 or the old identifer within the FL-SCAS is within the updated DCCHAS at step 212, then the identifier in the FL-SCAS is compared by the BSC to the identifier of the basestation producing the strongest pilot channel of the DCCHAS at step 216. If the old identifier within the FL-SCAS is found not to be the best identifier at step 216, then it may be that a hard handoff will be necessary for the DCCH.

In a preferred embodiment of the present invention, a hard handoff timer is used to avoid unnecessary repetitive hard handoffs due to a simple reordering of identifier set members, hereinafter referred to as ping-pong handoffs. Each hard handoff of the FL-SCH requires packet redirecting between the source and target basestations. For high rate data services, frequent packet redirecting can generate large amounts of network traffic. When active set members are reordered, it is still true that all of the active set members relate to basestations with which acceptable channels exist. However, the best channel may have changed. Since this change may be temporary due to temporary fading in a particular pilot channel or due to a mobile station exiting and entering the cell area of a basestation in a short period of time, and since postponing a handoff may not prevent the use of an acceptable channel, preferably a hard handoff timer is employed to limit these packet redirections by reducing the number of hard handoffs by delaying the hard handoff at least a predetermined amount timeout period (Th) has passed since the previous hard handoff. An appropriate length of time for Th is crucial since a long time may postpone handoff too long and result in high interference while too short a time may not reduce the number of ping-pong handoffs effectively. The hard handoff timer starts counting from zero whenever a hard handoff is completed. Alternatively, the hard handoff timer may be set to start at Th and count down to zero.

If, at step 216, the old identifier within the FL-SCAS is found not to correspond with the basestation producing the strongest pilot channel, then a determination is made at step 218 whether a threshold time period (Th) has passed since the last updating of the FL-SCAS. If the time period (Th) has passed and the old identifier within the FL-SCAS still does not correspond with the basestation producing the strongest pilot channel within the DCCHAS, then the BSC directs the updating of the FL-SCAS with the identifier of the basestation producing the currently best pilot channel of the DCCHAS as was described herein above at step 214. If, at step 218, the timeout period (Th) has not passed or if the identifier within the FL-SCAS was found to be the best at step 216, the old identifier within the FL-SCAS is kept as depicted at step 220. Therefore, no handoff is required for the FL-SCH, though an EEHDM may be required for one of the other active sets, in which case the FL-SCAS does not change within the EEHDM.

There are a number of key changes in situations where a soft handoff is possible. In most circumstances, there is no need for a handoff timer as described above since soft handoffs do not always require packet redirecting. It is noted though that some soft handoff situations do require packet redirecting and therefore in a preferred embodiment of the present invention a handoff timer would be applied as described above. As well, since there are multiple identifiers within the active sets during a soft handoff, there is not always a requirement for the associated pilot channels to be the best pilot channels available. It is preferable though that the identifier associated with the best pilot channel be included within the particular active set unless the particular basestation corresponding to the best pilot channel does not contain enough bandwidth to support the additional communications.

The advantages of preferred embodiments of the present invention are best shown with further specific examples.

One such example is now described with reference to FIGS. 3a, 3b, 3c, 3d, 3e, and 3f that together illustrate the handoff of a multi-service session of a mobile station 302 between first, second, and third basestations 304,306,308. Each subfigure within FIG. 3 includes a legend 310, that includes the listing of the current contents of the active sets for reference. In this example, there is a FCH 312 controlled with use of the FCAS, a FL-SCH 314 controlled with use of the FL-SCAS, a RL-SCH 316 controlled with use of the RL-SCAS, and a DCCH 318 controlled with use of the DCCHAS.

Figure 3A:
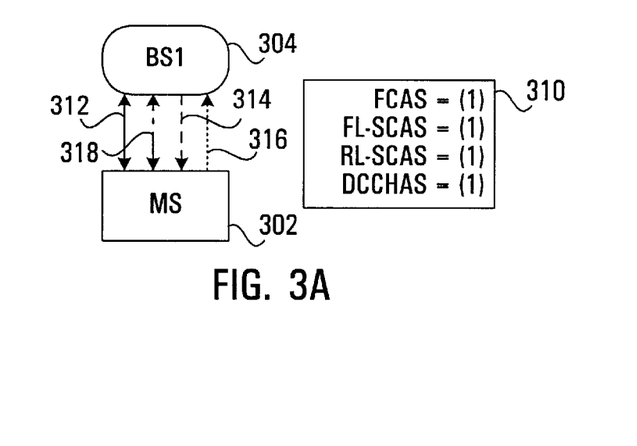
FIGS. 3a, 3b, 3c, 3d, 3e, and 3f illustrate steps performed, according to an embodiment of the present invention, during the handoff of an active session between three basestations.

FIG. 3a illustrates the existence of the FCH 312, FL-SCH 314, RL-SCH 316, and DCCH 318 between the mobile station 302 and the first basestation 304 before the start of the service handoff. The multi-service handoff of the session, in this example, is initiated by the mobile station moving from the coverage area of the first basestation 304 into the coverage area of the second basestation 306 and eventually travelling into the coverage area of the third basestation 308.

Figure 3B:
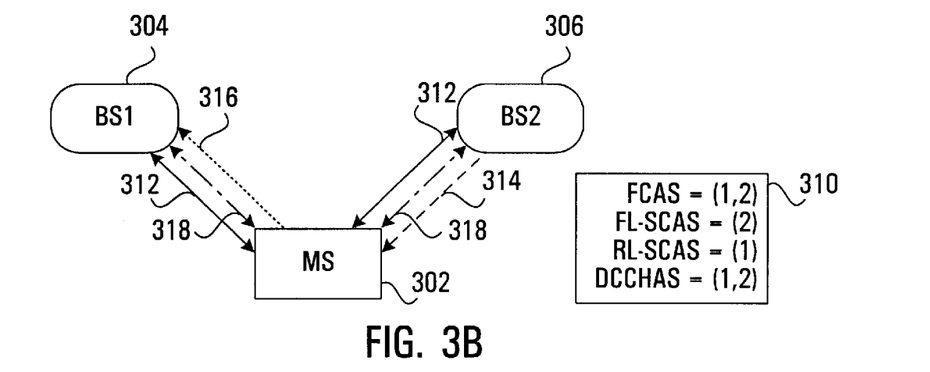

FIG. 3b illustrates the communication system after the first stage of the handoff procedure. In this situation, the FL-SCH 314 has performed a hard handoff from the first basestation 304 to the second basestation 306. This could be due to the first basestation 304 not having the capacity to maintain the FL-SCH 314 and/or due to a sharing of the FL-SCH 314 between mobile stations as will be described herein below. Also at this stage, the FCH 312 and the DCCH 318 have performed soft handoffs and are at this stage established between the mobile station 302 and both the first and second basestations 304,306. Typically, a FCH and a DCCH do not require significant resources and so a soft handoff is preferable if possible. At FIG. 3b, the RL-SCH 316 is still communicating exclusively with the first basestation 304.

Figure 3C:
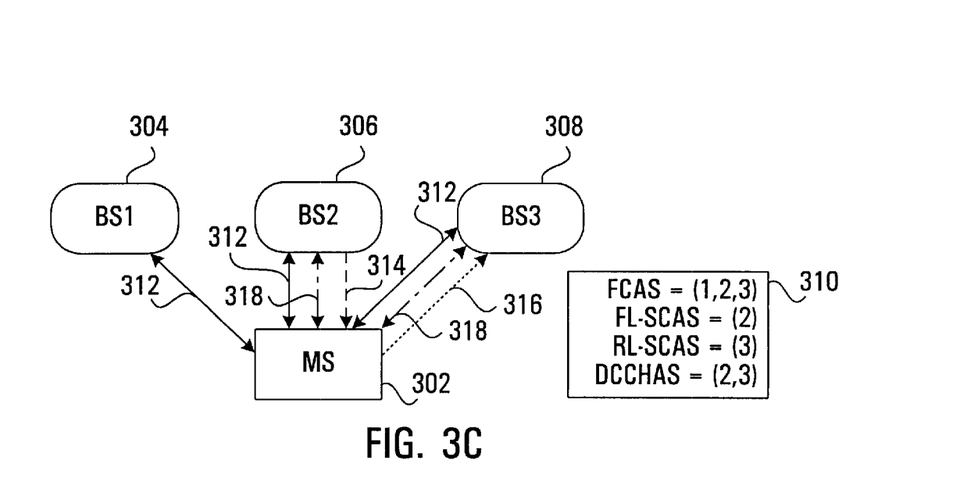

FIG. 3c illustrates the communication system after the second stage of the handoff procedure. At this stage, the FCH 312 has continued its soft handoff and is now established between the mobile station 302 and all three basestations 304,306,308. The DCCH 318 has also continued its soft handoff and is currently established between the mobile station 302 and both the second and third basestations 306,308. The present invention allows the flexibility for the FCH 312 and DCCH 318 to both perform soft handoffs that are not necessarily with identical basestations. As depicted at FIG. 3c, the RL-SCH 316 has now performed a hard handoff between the first basestation 304 and the third basestation 308. This situation could be caused by the second basestation 306 not having sufficient bandwidth to support communications with the RL-SCH and the pilot channel of the third basestation 308 being stronger than that of the first basestation 304. At this stage the FL-SCH 314 is still communicating with the second basestation 306. The FL-SCH 314, according to a preferred embodiment of the present invention, maintains communications with the basestation corresponding to the strongest pilot channel as previously described, which in this case is the pilot channel corresponding to the second basestation 306.

Figure 3D:
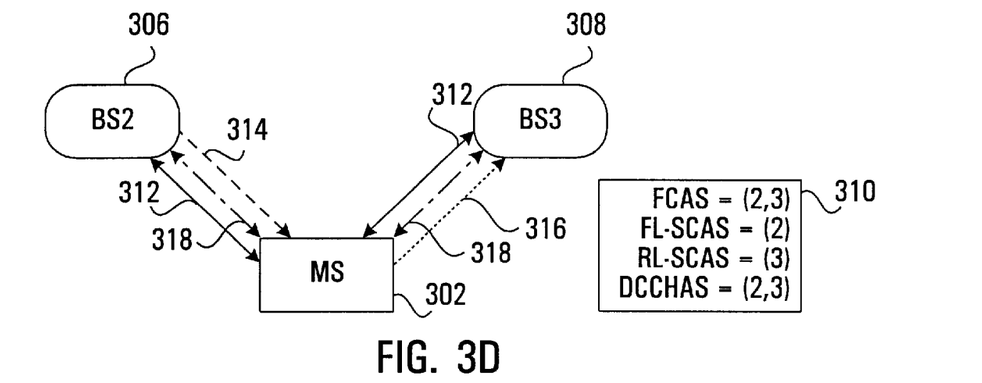
Figure 3E:
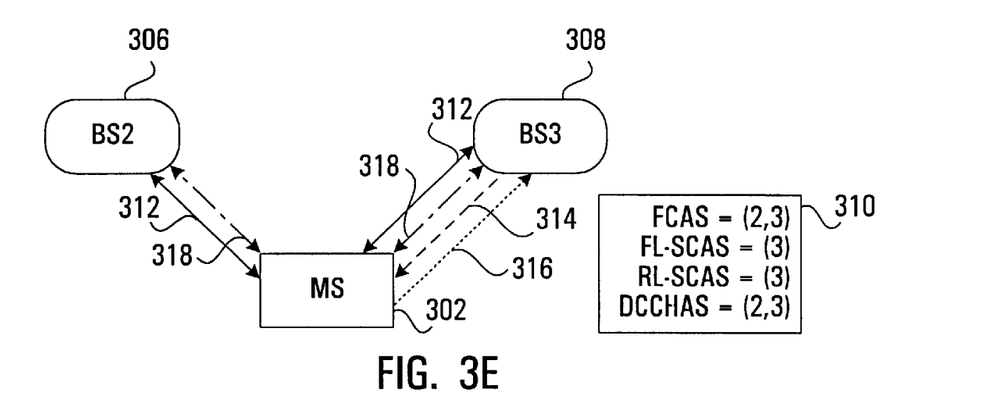

FIGS. 3d and 3e illustrate the communication system after the third and fourth stages of the handoff procedure. In the third stage, the only change is the continuation of the soft handoff process of the FCH 312. At this stage, the FCH is established between the mobile station 302 and the second and third basestations 306,308. During the fourth stage, the FL-SCH 316 performed another hard handoff from the second basestation 306 to the third basestation 308. This indicates that, at this stage, the pilot channel corresponding to the third basestation 308 is the strongest pilot channel.

Figure 3F:
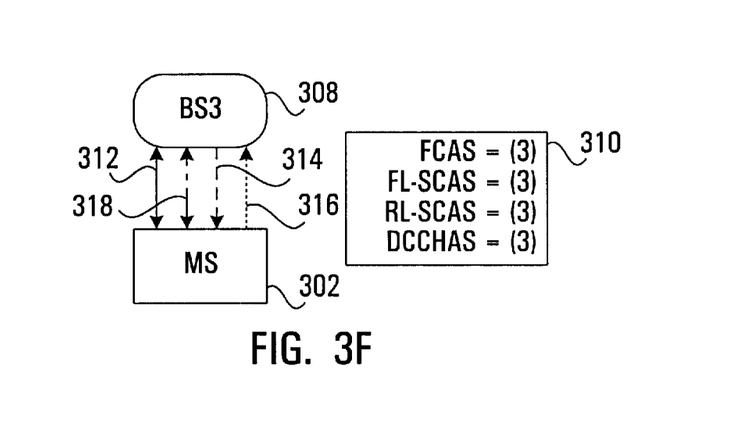

FIG. 3f illustrates the communication system after the completion of the handoff procedure as shown in this example. The final stage of the handoff was the completion of the soft handoffs of the FCH 312 and the DCCH 318, so that both are now only established between the mobile station 302 and the third basestation 308. Overall, this example demonstrates the considerable amount of flexibility that exists with the use of a preferred embodiment of the present invention that is not available in the handoff techniques defined within the IS-95-A and IS-95-B standards.

One embodiment of the present invention applicable in the context of 3G systems provides that the newly defined active sets (FL-SCAS, RL-SCAS, DCCHAS) are subsets of the FCAS and the FCAS functions like the AS in the IS-95-A and IS-95-B standards with relation to the CS, NS and RS. A variation of this embodiment provides that if there is no FCH established and therefore no need for a FCAS, then the FL-SCAS and RL-SCAS, if required, are subsets of the DCCHAS and the DCCHAS functions like the AS in IS-95-A, IS-95-B with respect to the CS, NS and RS.

In yet another embodiment of the present invention, one of the FL-SCAS and the RL-SCAS is a subset of the FCAS and the other of the FL-SCAS and the RL-SCAS is a subset of the DCCHAS. Another embodiment has each active set being completely independent with a corresponding CS, RS and NS being defined for each active set.

In the examples described above, all of the active sets that are established are stored at the mobile station and at each basestation included in the given active set. More generally, these need not necessarily be maintained within the basestations. Furthermore, active sets for reverse link channels need not necessarily be maintained by the mobile station.

Although it is not always necessary for the mobile station to store active sets for reverse link channels such as the RL-SCAS, a preferred embodiment of the present invention includes the RL-SCAS within the mobile station. This gains a number of advantages for the mobile station, such as allowing the mobile station to monitor the signal strength of the pilot channels for basestations identified in the RL-SCAS and report changes in the order of the pilot channels within the RL-SCAS with respect to signal strength. As well, the maintaining of the RL-SCAS at the mobile station in a preferred embodiment significantly benefits the power control of the mobile station. For example, if the mobile station is aware of the basestation that it is communicating with on the RL-SCH, the mobile station can adjust the power to the appropriate level.

While the additional active sets may be permanently allocated, preferably the establishment of these active sets is only done when the particular channel type corresponding to the active set is required for the specific service or services requested.

In one embodiment which comprises only one independent active set, an identifier that is added to the independent active set is removed from the CS. In some embodiments that comprise more than one independent active set, the identifiers within the CS that are added to one of the independent active sets do not get removed from the CS, hence being available to the other independent active sets. In yet other embodiments that comprise more than one independent active set, separate CSs are maintained for each independent active set, so the identifiers that are added to a particular independent active set are removed from its respective CS.

Returning now to 3G implementations, although in some circumstances the FL-SCH can perform soft handoff, typically the FL-SCH requires a hard handoff procedure. This can be due to the large network resources typically required for the FL-SCH or due to sharing of FL-SCHs between local mobile stations. In order to increase link efficiency, a FL-SCH can be time shared for several packet data sessions, therefore making soft handoff difficult to implement. In a preferred embodiment of the present invention, hard handoff is exclusively used for the FL-SCH during a sharing situation. It is noted that when the FL-SCH is shared between mobile stations, choosing the basestation with the strongest pilot channel as the active basestation typically minimizes the interference with the FL-SCHs of the other mobile stations.

The RL-SCH typically is capable of performing a soft handoff, and so in a preferred embodiment there is no need for packet redirection. Packets from a mobile station may be received by several basestations simultaneously. The setup of a RL-SCAS is first initiated when a RL-SCH is assigned. Preferably, a portion or all of the members of the current FCAS can be included within the RL-SCAS, as long as each basestation has the bandwidth to support a RL-SCH reception. In alternative embodiments, the RL-SCAS is defined as a subset of the DCCHAS.

Since signal transmission is duplex, there is no need to separate the DCCHAS by a FL and RL. If the DCCH is used continuously during the data session, soft handoff is preferred unless conditions force a hard handoff in order to maintain reliable control and message links. If the DCCH is not always required during a data session or if the DCCH is shared among several mobile stations, hard handoff may be used to reduce scheduling difficulties among the different basestations.

In the 3G DS-CDMA system, one key advantage of defining a separate DCCHAS is that for packet data services during a control hold state, as defined in the above-referenced preliminary report, the control DCCH is the only active channel. Therefore, according to a preferred embodiment, the only active set requiring maintenance is the DCCHAS.

According to a preferred embodiment of the present invention, if all current members in the various active sets, for example the FCAS, FL-SCAS, RL-SCAS, and DCCHAS, relate to basestation resources which can no longer support a physical channel, the search for possible members is extended to the current CS, NS or RS as was similarly defined for the IS-95-A and IS-95-B standards or to pilot channels in other DS-CDMA frequency assignments as defined in the IS-95-B standard.

The invention provides handoff methods which can be backward compatible with communication systems which comply with previously defined standards such as IS-95-A and IS-95-B by appropriately constraining the active sets to be identical for example. A preferred embodiment also maintains the definitions, initialization, and maintaining procedures of these sets described in the IS-95-A and IS-95-B standards. It is noted that the IS-95 defined sets may be the only needed sets for services exclusively requiring fundamental channels or low speed data circuit-switched symmetric services for handoff purposes in 3G DS-CDMA systems. In these cases, the additional sets described above that are not required, are not established according to a preferred embodiment. Overall, backward compatibility is achieved by supporting the well known IS-95-A and IS-95-B handoff procedures.

The selection of soft or hard handoff can be service and/or physical channel dependent. A hybrid handoff, that being a mixture of soft and hard handoff, occurs when some of the channels of a mobile station are capable of performing a soft handoff while the remainder must do a hard handoff. During one soft handoff cycle, more than one hard handoff may occur. For particular services or operation modes in 3G DS-CDMA systems, a hard handoff might be the only choice even if hard handoff conditions do not apply. For example, within the method provided by in a preferred embodiment, when several users share a FL-SCH to carry burst data, a hard handoff is done by all of the users to avoid scheduling problems.

It should be understood that alternative embodiments of the present invention are possible that have not been discussed herein above in detail. For example, one alternative embodiment has a separate active set established for individual channels without regard to the type of the channel. A further modification to this embodiment has separate active sets being established for groups of one or more channels each of which are not necessarily grouped by type.

Where pilot channels as contemplated by various existing standards have been used to describe the invention, it is to be understood that more generally the term "pilot channel" is intended to refer to any signal produced by a basestation upon which a signal strength measurement is taken by a mobile station for the purpose of assisting in handoff.

Identifier sets are used in existing systems to manage handoff. In these existing systems, a mobile station takes measurements of all the pilot channels it can see and sends these to a basestation/basestation controller which then instructs the mobile station to perform a handoff by sending updated identifier sets. According to an embodiment of the invention described in detail above, this technique has been applied to perform handoffs independently for different physical channels and/or for different groups of physical channels. It is to be understood that within the scope of the invention, other techniques may be used to achieve this end. For example, rather than maintaining identifier sets at the mobile station, these could be maintained by the mobile communication system, at active basestations or at the basestation controller for example. Rather than using the various active sets and the CS, NS and RS to manage the independent handoff of different physical channels or groups of physical channels, some other approach could be used, although in most cases something resembling the various active sets would be required at the least. Thus, for the purpose of this specification, an "active set" is simply any mechanism which identifies or allows an identification of one or more active basestation resources for a given physical channel or group of physical channels.

It has been previously indicated that handoff may be performed independently for each physical channel, or for groups of physical channels which are arbitrarily defined. In an example given above, groups of physical channels containing physical channels of common type are handed off independently. More generally, it is to be understood that a "group of physical channels" may be any collection of one or more physical channels. In the event that a given group only has one physical channel, then the handoff performed is equivalent to an independent physical channel handoff.

Persons skilled in the art will appreciate that there are alternative implementations and modifications possible to use a method and apparatus similar to that described above and that the above implementation is only an illustration of this embodiment of the invention. The scope of the invention, therefore, is only to be limited by the claims appended hereto.

What is claimed is:

1. A mobile station capable of having a plurality of groups of physical channels simultaneously and of performing handoff independently for at least two of said groups of physical channels, said mobile station arranged to maintain a respective active set identifying a set of basestations to be active for each group of the at least two of said groups of physical channels, wherein changes are made to the active sets of groups which have been determined to require handoff, and a handoff is performed for each group whose active set has been changed, by the handoff of communications from the basestations previously identified by the respective active set to the basestations identified by the respective active set after the changes have been made.

2. A mobile station according to claim 1 wherein said at least two of said groups of physical channels comprises all of said groups of physical channels.

3. A mobile station according to claim 1, wherein each of said groups of physical channels contains one physical channel.

4. A mobile station according to claim 1, wherein each of said groups of physical channels contains one or more channels of similar type.

5. A mobile station according to claim 1, wherein each of the physical channels represents a link between the mobile station and one or more basestations, and wherein the basestations involved in links for a first particular group of physical channels are limited to be a subset of the basestations involved in links for a second particular group of physical channels.

6. A mobile station according to claim 1, wherein each physical channel represents a link between the mobile station and one or more basestations, and wherein a handoff for a given group of physical channels is performed upon receipt of a message indicating a change in the basestations involved in links for that group of physical channels.

7. A mobile station according to claim 1, wherein the groups comprise a first group that contains a fundamental channel, a second group that contains a supplemental channel, and a third group that contains a dedicated control channel.

8. A mobile station according to claim 1, wherein the groups comprise a first group that contains a fundamental channel and a dedicated control channel, a second group that contains a forward link supplemental channel, and a third group that contains a reverse link supplemental channel.

9. A mobile station according to claim 1, wherein the groups comprise a first group that contains a fundamental channel, a second group that contains a forward link supplemental channel, a third group that contains a reverse link supplemental channel, and a fourth group that contains a dedicated control channel.

10. A mobile station according to claim 1 arranged to operate within a third generation code division multiple access (CDMA) communication system.

11. A mobile communication system, in combination with a mobile station according to claim 1, and further comprising one or more basestations involved in said groups of physical channels with the mobile station.

12. A mobile communication system according to claim 11 further comprising a basestation controller, coupled to the plurality of basestations, that controls handoffs by sending messages containing information allowing an identification of sets of basestations which are to maintain each of said groups of physical channels.

13. A mobile communication system according to claim 11, wherein the communication system is a third generation code division multiple access (CDMA) communication system.

14. A basestation capable of having a plurality of groups of physical channels with a mobile station simultaneously and of performing handoff independently for at least two of the groups of physical channels, said basestation arranged to maintain a respective active set identifying a set of basestations to be active for each group of the at least two of the groups of physical channels, wherein changes are made to the active sets of groups which have been determined to require handoff, and a handoff is performed for each group whose active set has been changed, by a handoff of communications from the basestation when the basestation is no longer identified by the respective active set after the changes have been made, and by the handoff of communications to the basestation when the basestation is identified by the respective active set after the changes have been made.

15. A basestation according to claim 14 capable of performing handoff independently for each of said plurality of groups.

16. A basestation according to claim 14, wherein each of said groups of physical channels contains one physical channel.

17. A basestation according to claim 14, wherein each of said groups of physical channels contains one or more channels of similar type.

18. A basestation according to claim 14, wherein each physical channel represents a link between the mobile station and the basestation, and wherein a handoff for a given group of physical channels is performed upon receipt of a message indicating a change in the basestation for that group of physical channels.

19. A basestation according to claim 14, wherein the groups comprise a first group that contains a fundamental channel, a second group that contains a supplemental channel, and a third group that contains a dedicated control channel.

20. A basestation according to claim 14, wherein the groups comprise a first group that contains a fundamental channel and a dedicated control channel, a second group that contains a forward link supplemental channel, and a third group that contains a reverse link supplemental channel.

21. A basestation according to claim 14, wherein the groups comprise a first group that contains a fundamental channel, a second group that contains a forward link supplemental channel, a third group that contains a reverse link supplemental channel, and a fourth group that contains a dedicated control channel.

22. Within a mobile communication system, a method of performing a handoff of a mobile station capable of having a plurality of groups of physical channels simultaneously, the method comprising:

maintaining a respective identification identifying a set of basestations to be active for each particular group of physical channels;

determining whether a handoff is required for any of the groups of channels, and making changes to The respective identification of any group requiring handoff; and independently performing a handoff for each group requiring handoff by handing off communications from the basestations previously identified by the respective identification of the set to the basestations identified after the changes have been made.

23. A method according to claim 22, further comprising performing handoff independently for each of said plurality of groups.

24. A method according to claim 23, wherein each of said groups of physical channels contains one physical channel.

25. Within a mobile communication system, a method of performing a handoff of a mobile station capable of having a plurality of groups of physical channels simultaneously, the method comprising:

defining a respective active set identifying a set of basestations to be active for each particular group of physical channels;

determining whether a handoff is required for any of the groups of channels and if so making changes to the active sets of these groups; and     independently performing a handoff for each group which has changed by handing off communications from the basestations previously identified by the respective active set to the basestations identified after the changes have been made.

26. A method according to claim 25, wherein each of said groups of physical channels contains one or more channels of similar type.

27. A method according to claim 25, wherein each of the physical channels represents a link between the mobile station and one or more basestations, and wherein the basestations involved in links for a first particular group of physical channels are limited to be a subset of the basestations involved in links for a second particular group of physical channels.

28. A method according to claim 25 comprising:

at least one basestation sending one or more messages to the mobile station identifying basestations to maintain channels for given groups of physical channels.

29. A method according to claim 25, further comprising preventing the consecutive handoffs of a group of physical channels from occurring in less than a predetermined time.

30. A method according to claim 25, wherein the step of independently performing a handoff comprises performing a first type of handoff which is independent of a second type of handoff of any other previous or subsequent handoff if any.

31. A method according to claim 30, wherein each of the first and second type of handoff comprises any one of the group consisting of soft handoff, softer handoff, and hard handoff.

32. A mobile station capable of having a plurality of groups of physical channels simultaneously and of performing handoff independently for at least two of said groups of physical channels, said mobile station arranged to maintain a respective identification identifying a set of basestations to be active for each group of the at least two of said groups of physical channels, wherein changes are made to the identification of groups which have been determined to require handoff, and a handoff is performed for each group whose identification has been changed, by the handoff of communications from the basestations previously identified by the respective identification to the basestations identified by the respective identification after the changes have been made.

\* \* \* \* \*